United States Patent [19]
Norfolk et al.

[11] Patent Number: 6,122,994
[45] Date of Patent: Sep. 26, 2000

[54] HOUSING FOR A BOAT LIFT MOTOR, PULLEY AND GEAR DRIVE

[75] Inventors: Lynn P. Norfolk; David Charles Peterson, Jr., both of Edgewater; Ronald Price Ranere, Chesapeake Beach; Russell V. Welton, Grasonville; J. David Augustine, Laurel, all of Md.

[73] Assignee: Norfolk Fabrication, Inc., Mayo, Md.

[21] Appl. No.: 09/207,253

[22] Filed: Dec. 9, 1998

[51] Int. Cl.⁷ .............................. F16H 57/02; B63C 3/06
[52] U.S. Cl. .................. 74/606 R; 29/401.1; 74/89.14; 114/44; 403/4; 405/3; 405/221
[58] Field of Search .................. 29/401.1; 74/89.14, 74/606 R; 114/44; 403/4; 405/3, 221

[56] References Cited

U.S. PATENT DOCUMENTS

| | | | |
|---|---|---|---|
| 2,832,229 | 4/1958 | Rieser | 74/606 R X |
| 2,976,745 | 3/1961 | Bade | 74/606 R |
| 3,964,344 | 6/1976 | Horvath et al. | 74/606 R X |
| 4,924,689 | 5/1990 | Wilson | 74/606 R X |
| 5,810,508 | 9/1998 | Norfolk et al. | 74/606 R X |

OTHER PUBLICATIONS

Nov. 16, 1998 letter from Chet Hauck w/Exhibits (9).
Mar. 25, 1997 letter from Frank Foster w/enclosures (4).

*Primary Examiner*—Allan D. Herrmann
*Attorney, Agent, or Firm*—Diller, Ramik & Wight, PC

[57] ABSTRACT

A housing for at least partially housing a boat lift pulley of a boat lift includes a main wall having a substantially vertically disposed wall portion defining an inwardly opening generally concave chamber adapted to at least partially receive therein a boat lift pulley. The main wall includes vertical and horizontal planes disposed substantially normal to each other with the concave chamber being offset to one side of the vertical plane. First and second wall portions of the main wall located at opposite sides of the horizontal plane are adapted for selective removal whereby a gear driven shaft can project therethrough to adapt a housing for selective utilization in either of two positions of installation oriented 180° relative to each other. A peripheral edge portion of the main wall preferably includes symmetrically located fasteners for securing the housing to a companion housing in each of the two positions of 180° oriented installation.

72 Claims, 3 Drawing Sheets

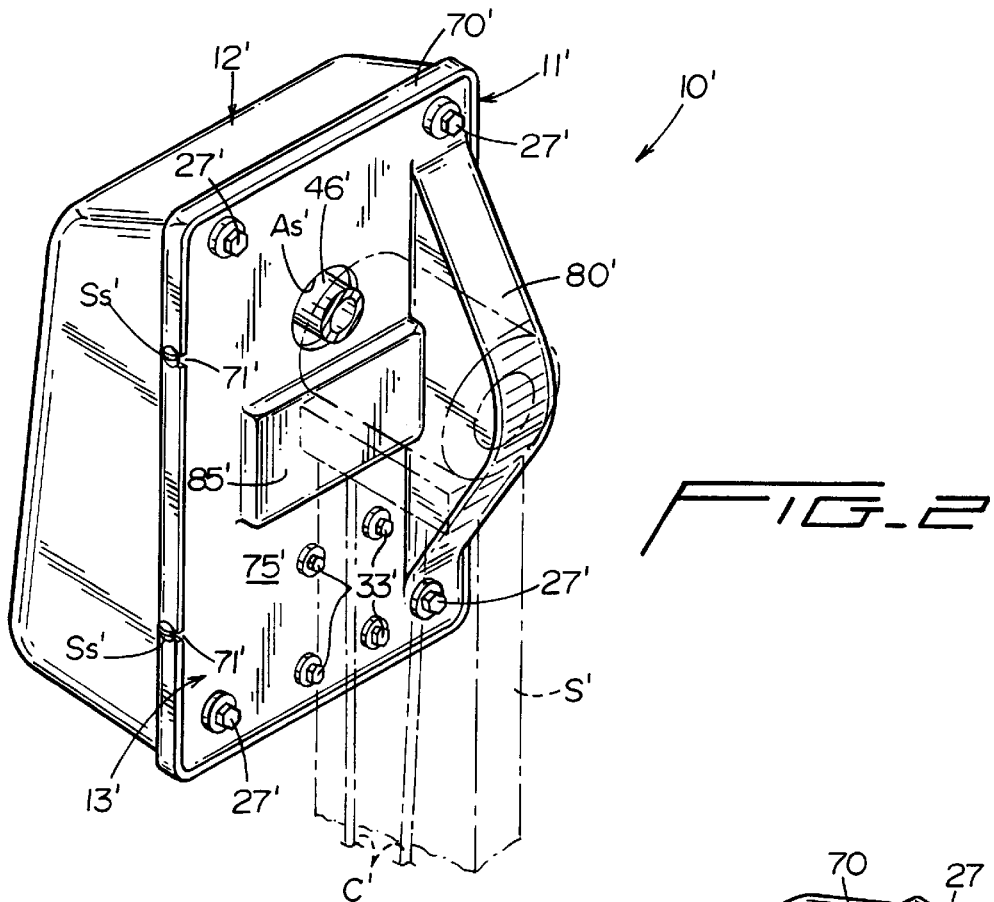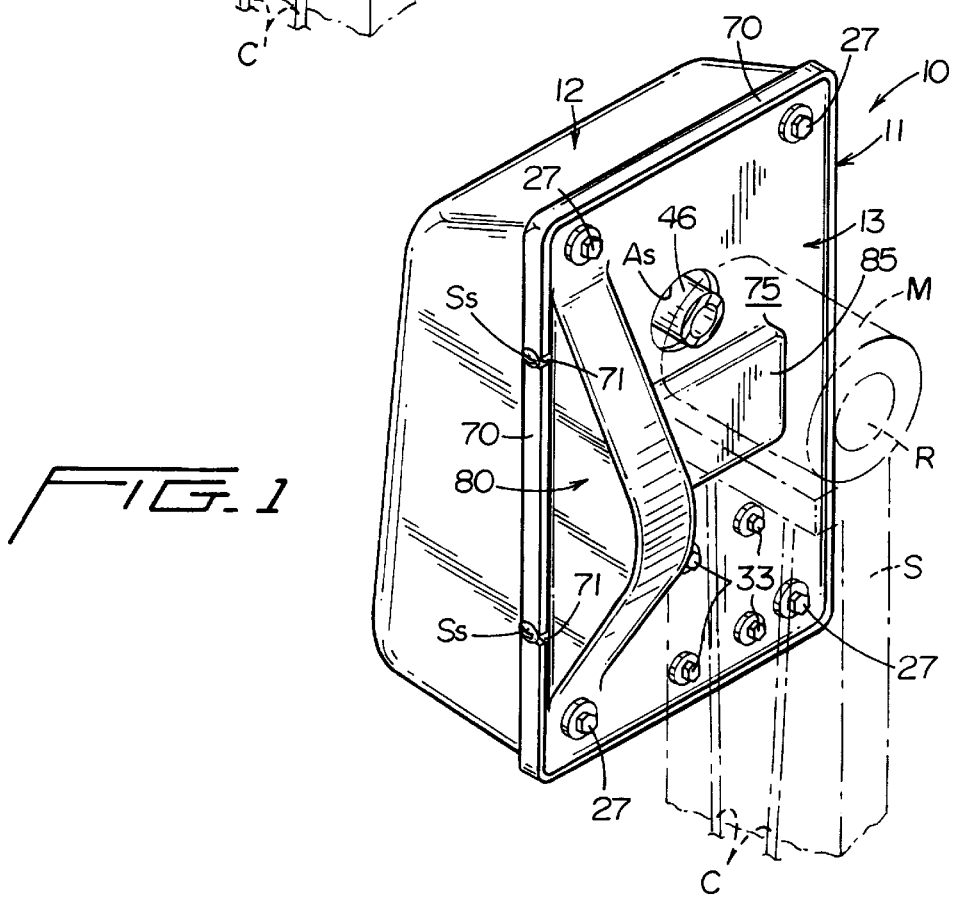

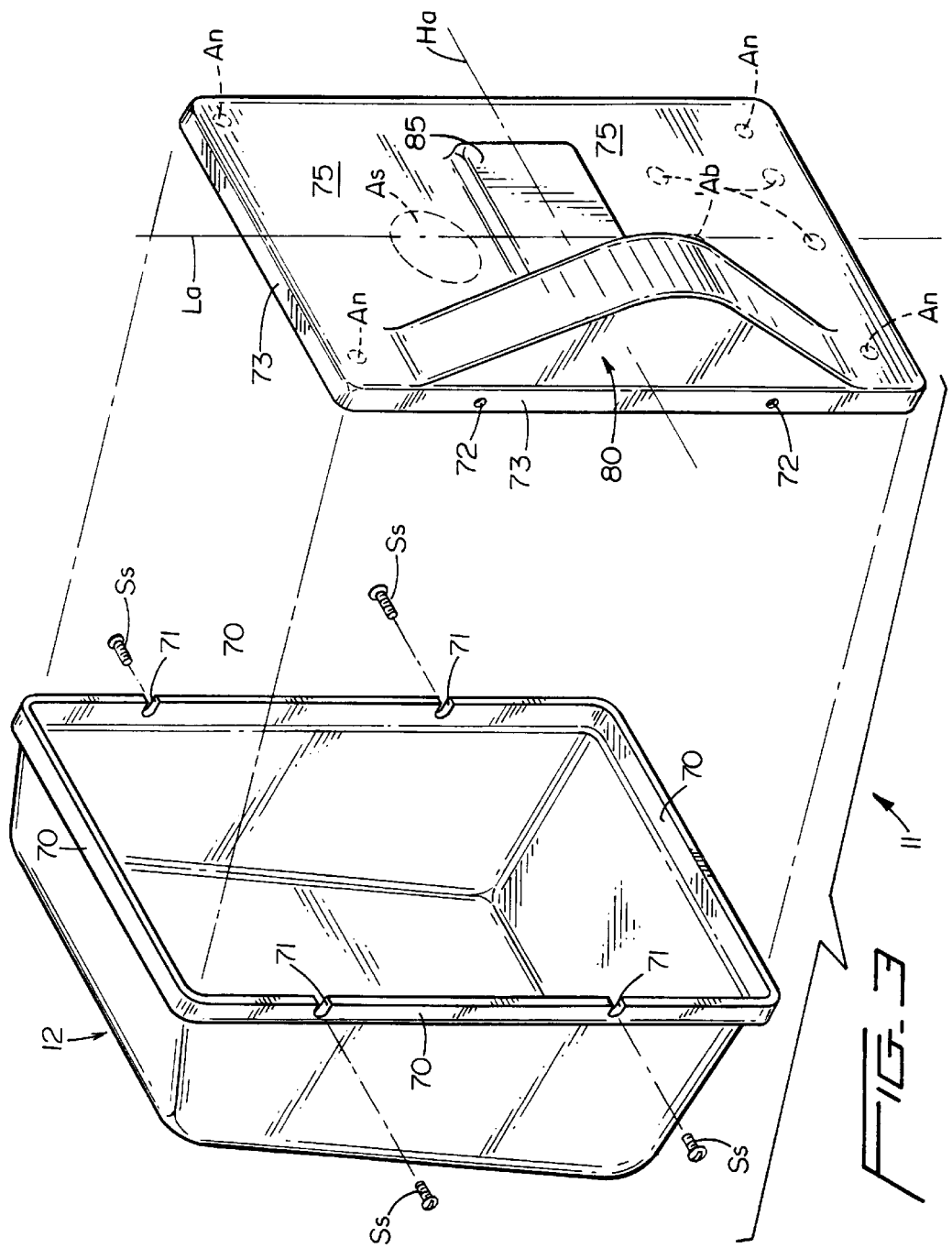

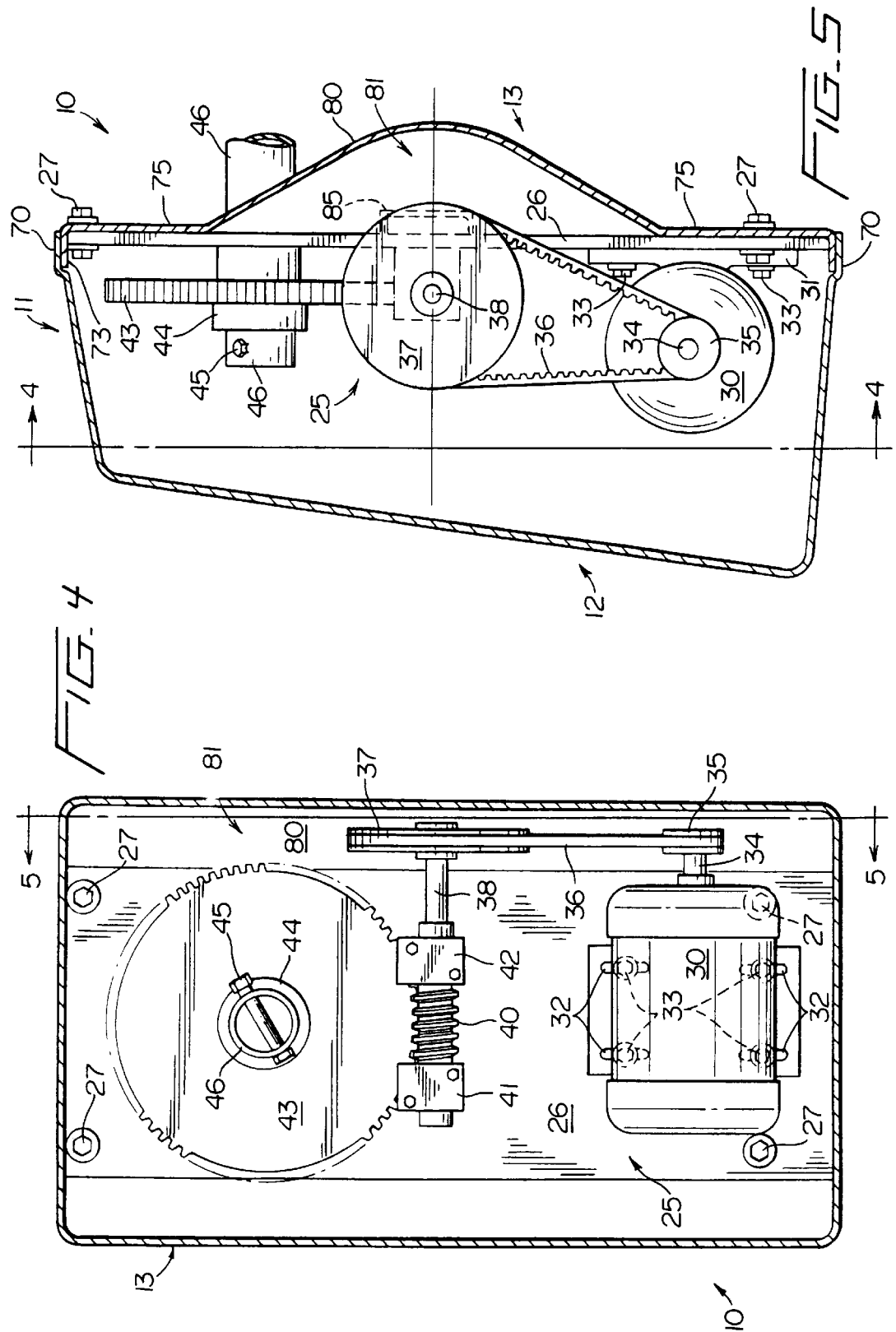

HOUSING FOR A BOAT LIFT MOTOR, PULLEY AND GEAR DRIVE

BACKGROUND OF THE INVENTION

It has been conventional for many years to provide boat lifts immediately adjacent docks, piers and the like to lift boats out of the water to effect temporary or relatively permanent storage, maintenance and minor service and/or repair. A platform, preferably provided with a custom hull support upon which a boat rests, is lifted and lowered through a winching system which includes steel cables wound upon winding reels or drums which are in turn secured to reel shafts journalled for rotation upon a relatively rigid mounting plate. The mounting plate also carries an electric motor which through a pair of pulleys and a pulley belt imparts rotation through a gear drive to a shaft of the winding reel. Two such boat lift motors and drive assemblies might be utilized for lifting the boat relative to water, each on the same side of the boat, one adjacent the bow and one adjacent the stern. By selectively energizing the electric motors, a boat resting upon the hull support or platform can be lifted and lowered for ingress/egress and storage/servicing purposes.

Such boat lift systems are highly advantageous since they protect boat hulls from damage which might be caused by storms, wave action and tides. Boat bottom cleaning and/or painting is minimized and, therefore, sluggish boat performance caused by fouled boat bottoms is markedly reduced. Obviously, trailer launching and loading is avoided and boat damage common thereto is likewise eliminated. Furthermore, the news of approaching storms and high winds no longer requires a trip to the marina or dock to check the lines of a conventionally moored floating boat. Thus, boat lift motor and drive systems and the associated boat lifts allow more time for boating in an enjoyable manner absent the inherent worries stemming from floating boat mooring.

Such conventional boat lift drive systems, unfortunately, are subject to corrosion and electrolysis because they are left unprotected from the elements. Water, particularly salt water, is extremely corrosive, but dirt and debris can create wear and premature parts failure. Electric motors are particularly adversely effected from exposure to the elements and an expected day of joyful boating can be cut short abruptly when a boater finds an electric lift motor has been burned out, and a part or all of an otherwise enjoyable day of boating is devoted to acquiring a new motor and effecting repair and replacement for subsequent boat outings.

U.S. Pat. No. 5,810,508 issued on Sep. 22, 1998 and assigned to Norfolk Fabrication, Inc., the assignee herein, provides a novel housing which avoids problems associated with corrosion, electrolysis, dirt, debris and the like. However, the housing disclosed in the latter-identified patent requires the manufacture of two different back covers or rear covers, one for a "left-hand" installation and the other for a "right-hand" installation. Right-hand and left-hand installations are generally required when two boat lift motors and drive assemblies are utilized in a single boat lift with one such housing being located adjacent the bow, and the other housing being located adjacent the stern, as described earlier herein. When such an installation is viewed from water-side or boat-side, a generally vertically disposed wall which defines a chamber for partially receiving a drive pulley is located to the left of a drive shaft opening located in one rear cover, but such vertically disposed wall is located to the right of a like drive shaft opening of the other rear cover. This necessitates the manufacture of two different rear covers and problems associated therewith, including the obvious increase in costs involved in manufacturing two different parts, separate inventories therefor, and associated installation problems when an installer inadvertently takes two left-hand rear covers or two right-hand rear covers to the site of a boat lift installation when one of each is normally required.

SUMMARY OF THE INVENTION

In keeping with the foregoing, a primary object of the present invention is to provide a novel housing for a boat lift motor and drive assembly which includes interchangeable front covers and back or rear covers irrespective of left-hand or right-hand (bow or stern and vice versa) installation. Since the front covers and rear covers are interchangeable, manufacturing costs are reduced, inventory costs are reduced, and errors in selecting a specific cover for bow and/or stern or left and/or right installations are totally eliminated.

In keeping with the present invention, the rear housing body or rear cover is molded as a one-piece polymeric/copolymeric body having a main wall substantially devoid of apertures with medial vertical and horizontal planes being disposed substantially normal to each other. A vertically disposed wall portion of a main wall of the rear cover is laterally offset relative to the vertical plane and is substantially bisected by the horizontal plane. The latter relationship accommodates a pulley in a chamber defined by the vertically disposed wall portion in each of two positions of installation oriented 180° relative to each other, namely, right-hand and left-hand installations. Since the rear cover is totally devoid of an opening for the cable reel or drum drive shaft, the installer need but form such an opening during installation, as required. In one case, the opening is cut in the main wall essentially to the right of the vertically disposed wall portion, while in another case, the opening is cut to the left of the vertically disposed wall portion. In this manner, a mere relative 180° difference in orientation between the two effectively achieves right-hand and left-hand assembly/installation.

The front cover and rear cover of each right-hand and/or left-hand housing also include symmetrical fastening means which allows any front cover to be fastened to any rear cover in any 180° relative position of orientation.

The foregoing front and rear covers effectively minimize manufacturing and inventory costs and avoid installation mistakes and downtime associated therewith.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a rear perspective view of a novel boat lift motor and drive assembly housing of the present invention, and illustrates a first housing body or front cover secured to a second housing body or rear cover with a cable drum drive shaft opening being located to the right of a vertically disposed wall housing a pulley of a drive assembly.

FIG. 2 is a perspective view of another housing of the present invention, and illustrates a second identical front cover and a second identical rear cover as those illustrated in FIG. 1 with the rear cover of FIG. 2 being oriented 180° relative to the rear cover of FIG. 1 such that the opening for the cable reel drive shaft is located to the left of the vertically disposed wall portion in FIG. 2.

FIG. 3 is a perspective exploded view of the housing of FIG. 1, and illustrates the front cover and the rear cover with a main wall of the latter being devoid of any openings or apertures though phantom lines illustrate areas in which openings and/or apertures are to be formed on site during installation to permit the assembly thereof, as is illustrated in FIG. 1.

FIG. 4 is a cross-sectional view taken generally along line 4—4 of FIG. 5, and illustrates a relatively rigid mounting plate supporting a winding reel output shaft coupled to a gear meshed with a worm gear which in turn is driven by a driven pulley through a pulley belt connected to a drive pulley rotated by a drive shaft of an electric boat lift motor.

FIG. 5 is a cross-sectional view taken generally along line 5—5 of FIG. 4, and illustrates the manner in which the driven pulley is partially housed within a chamber or recess of the vertically disposed wall portion of the rear cover of FIG. 1.

DESCRIPTION OF THE PREFERRED EMBODIMENT

A novel boat lift motor and drive assembly constructed in accordance with this invention is illustrated in FIGS. 4 and 5 of the drawings and is generally designated by the reference numeral 10.

The boat lift motor and drive assembly 10 is covered by a housing 11 (FIGS. 1 and 3 through 5 of the drawings) which includes a first housing body or front cover 12 and a second housing body or rear/back cover 13.

Another housing 11' illustrated in FIG. 2 of the drawings is identical to the housing 11 and, thus, includes identical, though primed, reference numerals to indicate identical components thereof, including a front cover 12' and a rear cover 13'. Therefore, the description of the housing 11 with respect to all of its components is applicable to all primed numbered components of the housing 11'. The significant difference between the two housings 11, 11' will be more apparent hereinafter, and essentially relates to the orientation of the boat lift motor and drive assembly 10 associated therewith, as will be described more fully hereinafter.

The boat lift motor and drive assembly 10 is supported from an upper end portion of a vertically oriented galvanized metallic support S (FIG. 1) with a counterpart boat lift motor and drive assembly (not shown) being similarly supported from an upper end portion of a vertically oriented galvanized metallic support S' (FIG. 2).

The support S has welded or otherwise secured thereto a cylindrical galvanized metal protective mesh cover M in which is housed a reel or drum R upon which is wound and/or unwound stainless steel cable C. The boat lift motor and drive assembly 10 is essentially suspendingly cantilever-supported from the upper end portion of the support S through the reel R, a shaft associated therewith, and associated bearings having stationary outer races fixed to the upper end portion (unnumbered) of the support S in a conventional manner.

The boat lift motor and drive assembly 10 includes a drive mechanism 25 carried by a relatively rigid rectangular mounting plate 26 which is in turn secured to the rear or back cover 13 by four sets of nuts, bolts and washers, which are collectively each identified by the reference numeral 27. The bolts (individually numbered) pass through circular openings (unnumbered) preferably formed during the molding of the rear cover 13 or alternately formed at the site of boat lift installation by cutting or drilling such openings in relatively symmetrically oriented circular areas An (FIG. 3) of the rear cover 13.

The drive mechanism 25 includes an electric boat lift motor 30 having a base plate 31 and four slots 32 (FIG. 4) through which pass bolts (individually unnumbered) of a set of nuts, washers and bolts which are collectively identified by the reference numeral 33. The bolts pass through the slots 32 and each bolt passes through an opening or aperture Ab formed in the rear cover 13 on site during installation of a boat lift.

The motor 30 includes a drive shaft 34 having a pulley 35 keyed thereto about which is entrained a pulley belt 36. The pulley belt 36 is in turn entrained about a pulley 37 keyed to a shaft 38 which includes a worm drive or worm gear 40 (FIG. 4). The shaft 38 is rotated in bearings (not shown) of journals 41, 42 conventionally bolted by bolts (unnumbered) to the plate 26. The worm gear 40 meshes with a gear or gear wheel 43 having a drive shaft 44 connected by a diametrically disposed pin 45 to a drive shaft 46 of the reel R. As can be readily visualized in FIGS. 4 and 5 of the drawings, rotation of the shaft 34 in either of opposite directions imparts rotation to the reel R (through the components 34-38, 40 and 43-44) which in turn winds the cable C upon or plays the cable C from the reel R to lift or lower a boat associated with a boat lift in a conventional manner.

The shaft 46 projects through a circular area, opening or aperture As in the rear cover 13 which is also cut out at the site of the boat lift installation.

Details beyond those described concerning the operation of the motor M and switches (not shown) associated therewith can be found in prior identified, commonly assigned U.S. Pat. No. 5,810,508, which details are incorporated herein by reference.

The front cover 12 is of a one-piece molded polymeric/copolymeric construction and includes a peripheral margin, periphery or peripheral portion 70 (FIGS. 2, 3 and 4) having four outwardly opening slots 71 disposed in a symmetrical pattern relative to each other which corresponds to threaded openings 72 in a periphery 73 of the rear cover 13 (FIG. 3). The front cover 12 can be vacuum molded, injection molded or the like, and the slots or notches 71 can be formed during the molding operation or post-formed thereafter.

The periphery 70 (FIGS. 2, 3 and 4) of the front cover 12 substantially externally matches or mates with the periphery 73 of the rear cover 13 with the slots 71 being, as noted earlier, symmetrical relative to the threaded openings 72. Therefore, the rear cover 13 can be rotated 180° from the position shown in FIG. 3 and will mate with the front cover 12 with, of course, bolts or screws Ss being utilized to hold the front cover 12 upon the rear cover 13. The latter relationship is illustrated in FIG. 2 relative to the cover 12', 13' which are oriented 180° relative to the position of the cover 12, 13 of FIG. 1.

The rear cover 13 includes a main wall 75 (FIG. 3) of a relatively polygonal or rectangular configuration, as defined by the periphery or flange 73. The overall rear cover 13 includes a longitudinal axis La which is disposed substantially normal to a horizontal axis Ha. A generally vertically disposed wall portion 80 of the main wall 75 is disposed generally parallel to the longitudinal axis La and is essentially parallel thereto. In other words, a plane taken vertically or longitudinally through the vertical wall portion 80 is essentially parallel to the longitudinal plane or axis La.

Additionally, the vertically disposed wall portion 80 defines an inwardly opening similarly contoured concave chamber 81 (FIGS. 4 and 5) which partially houses the pulley 37 and a portion of the pulley belt 36 (FIG. 5). The vertically disposed wall portion 80 is substantially bisected by the horizontal axis or plane Ha, as is best illustrated in FIG. 5 of the drawings, and intersects an axis (unnumbered) of the shaft 38 (FIG. 5). Additionally, a generally rectangular reinforcing rib 85 projects outwardly from the main wall 75 and similarly bisects the horizontal axis or horizontal plane Ha, as is best viewed in FIG. 5 of the drawings. The rib 85 blends or merges with the vertically disposed wall portion 80 in the manner readily apparent from FIGS. 2 and 5 of the drawings. The area As (FIG. 3) is located above the rib 85 and an axis (not shown) of the opening 46 which is formed by removing the area As lies on the longitudinal axis La.

As in the case of the front cover 12, the rear cover 13 is also constructed as a one-piece substantially homogeneous molded piece of polymeric/copolymeric material which after molding excludes any holes, openings or apertures therein, although the apertures 72 and An can be formed during the molding of the rear cover 13. In other words, in FIG. 3 of the drawings, the rear cover 13 is illustrated in its "as-molded" condition, except the openings 72 have been illustrated as being post-formed therein. However, the opening 72 can be formed during the molding operation without departing from the spirit of the present invention. Similarly, the areas An, one in each corner of the rear cover 13, can be formed with openings or apertures therein at the site of installation or these openings can be formed instead during the molding of the rear cover 13, again without departing from the spirit of this invention.

It is important in keeping with this invention to recognize that the wall portions or areas Ab, As of the main wall 75 are completely devoid of openings during molding of the rear cover 13. However, at the installation site, the workman decides whether the rear cover 13 of FIG. 3 is to be a right-hand or left-hand cover. Once this decision is made, the area As of FIG. 3 is removed, as are the four areas Ab to form corresponding openings. The cover 13 thus cut corresponds at the site of installation to the cover illustrated in FIG. 1, namely, the wall portion or area As has been removed to form the opening 46 and the areas Ab have been removed to form apertures or openings for the bolts of the sets of bolts, washers and nuts 33. As viewed from boat-side, the pulley 37, the chamber 81 and the vertically disposed wall portion 80 are to the left. However, the same rear cover 13 of FIG. 3 can be installed as a right-hand rear cover 13' of FIG. 2 by simply rotating an uncut cover 13 180° from the position illustrated in FIG. 3 and cutting the opening 46' from the material at the opposite side of the rib 85, as is readily apparent from a comparison of FIGS. 1 and 2 of the drawings and the rear covers 13, 13', respectively. Similarly, the material or wall portions Ab of the rear cover 13' are removed for the set of nuts, bolts and washers 33', as is reflected in FIG. 2 to effect right-hand installation of the rear cover 13'. Thus, the uncut rear cover 13 can be utilized therefrom as either a left-hand rear cover (FIG. 1) or a right-hand rear cover 13' (FIG. 2) by appropriately removing wall portions AS, As', Ab and Ab' therefrom.

Since the front cover 12 can by symmetrically fastened to the rear cover 13 or 13', it is necessary only to stock one style front cover 12 and one style uncut rear cover 13 or 13', namely, the rear cover of FIG. 3 devoid of removed material in the area As and the areas Ab (or the equivalent areas As', Ab' of the rear cover 13'). Perhaps stated otherwise, the main wall 75 of the rear cover 13 is essentially devoid of any significant openings immediately upon molding and, more importantly, is devoid of any openings for providing access for the reel drive shaft 46 or 46' or the mounting plate bolts 33 or 33'. The presence or absence of openings at the corner areas An or the openings 72 at the periphery of the rear cover 13 is a molding alternative, though the openings 72 must be symmetrical to the slots 71 to permit identical front covers to be connected to right-hand or left-hand rear cover installations and the openings at An must be symmetrical to effect 180° orientation of covers 13, 13' relative to the plate 26 and the drive assembly 25 thereof. Thus, the drive mechanism 25 is not only protected, but only two components 12, 13 need be manufactured, inventoried and/or utilized to form each total housing 11, 11' whether a right-hand or a left-hand boat installation.

Although a preferred embodiment of the invention has been specifically illustrated and described herein, it is to be understood that minor variations may be made in the apparatus without departing from the spirit and scope of the invention, as defined the appended claims.

We claim:

1. A housing for a boat lift motor, pulley drive and gear drive comprising first and second housing bodies cooperatively defining a chamber adapted to house a boat lift motor, a pulley drive and a gear drive; said first housing body having opposite side edge portions, opposite upper and lower edge portions and substantially medially located vertical and horizontal planes disposed substantially normal to each other; said edge portions being peripherally disposed about a main wall of said first housing body; said main wall including first and second wall portions located at opposite sides of said horizontal plane and being adapted for selective removal whereby a gear driven shaft can project therethrough to adapt said first housing body for selective utilization in either of two positions of installation oriented 180° relative to each other; a substantially vertically disposed wall portion of said main wall defining an inwardly opening generally concave chamber adapted to at least partially receive therein a pulley of an associated pulley drive; and said vertically disposed wall portion being laterally offset relative to said vertical plane and being substantially bisected by said horizontal plane to thereby accommodate a pulley therein in each of said two positions of 180° oriented installation.

2. The housing as defined in claim 1 including means for removably securing said first and second housing bodies to each other.

3. The housing as defined in claim 2 wherein said removably securing means are symmetrically located for securing said first and second housing bodies to each other in each of said two positions of 180° oriented installation.

4. The housing as defined in claim 1 including a substantially rigid mounting plate within said chamber upon which is adapted to be mounted a motor, a pulley drive and a gear drive; and means for fastening said boat lift motor to the unremoved of the first and second wall portions in the second position of 180° oriented installation.

5. The housing as defined in claim 1 including a substantially horizontally disposed wall portion of said main wall defining an outwardly projecting reinforcing rib disposed substantially between said first and second wall portions.

6. The housing as defined in claim 1 including a substantially horizontally disposed wall portion of said main wall defining an outwardly projecting hollow rib disposed substantially between said first and second wall portions.

7. The housing as defined in claim 1 including a substantially horizontally disposed wall portion of said main wall defining an outwardly projecting reinforcing rib merging with said substantially vertically disposed wall portion.

8. The housing as defined in claim 1 including a substantially horizontally disposed wall portion of said first main wall defining an outwardly projecting hollow reinforcing rib merging with said substantially vertically disposed wall portion.

9. The housing as defined in claim 1 wherein each of said first and second housing bodies are of an integral one-piece construction.

10. The housing as defined in claim 1 wherein said main wall is of a molded integral one-piece construction initially devoid of openings in said first and second wall portions, and a substantially continuous cut peripheral edge defining an opening in one of said first and second wall portions.

11. The housing as defined in claim 1 wherein said first and second housing bodies include respective first and second peripheral edges in mating relationship to each other, and said removably securing means are a plurality of fasteners symmetrically disposed about and securing together said first and second peripheral edges in each of said two positions of 180° oriented installation.

12. The housing as defined in claim 3 including a substantially rigid mounting plate within said chamber upon which is adapted to be mounted a motor, a pulley drive and a gear drive; and means for fastening said boat lift motor to the unremoved of the first and second wall portions in the second position of 180° oriented installation.

13. The housing as defined in claim 3 including a substantially horizontally disposed wall portion of said main wall defining an outwardly projecting reinforcing rib disposed substantially between said first and second wall portions.

14. The housing as defined in claim 2 including a substantially horizontally disposed wall portion of said main wall defining an outwardly projecting hollow rib disposed substantially between said first and second wall portions.

15. The housing as defined in claim 3 including a substantially horizontally disposed wall portion of said main wall defining an outwardly projecting reinforcing rib merging with said substantially vertically disposed wall portion.

16. The housing as defined in claim 3 including a substantially horizontally disposed wall portion of said first main wall defining an outwardly projecting hollow reinforcing rib merging with said substantially vertically disposed wall portion.

17. The housing as defined in claim 3 wherein said main wall is of a molded integral one-piece construction initially devoid of openings in said first and second wall portions, and a substantially continuous cut peripheral edge defining an opening in one of said first and second wall portions.

18. The housing as defined in claim 3 wherein said first and second housing bodies include respective first and second peripheral edges in mating relationship to each other, and said removably securing means are a plurality of fasteners symmetrically disposed about and securing together said first and second peripheral edges in each of said two positions of 180° oriented installation.

19. The housing as defined in claim 4 including a substantially horizontally disposed wall portion of said main wall defining an outwardly projecting reinforcing rib disposed substantially between said first and-second wall portions.

20. The housing as defined in claim 4 including a substantially horizontally disposed wall portion of said main wall defining an outwardly projecting hollow rib disposed substantially between said first and second wall portions.

21. The housing as defined in claim 4 including a substantially horizontally disposed wall portion of said main wall defining an outwardly projecting reinforcing rib merging with said substantially vertically disposed wall portion.

22. The housing as defined in claim 4 including a substantially horizontally disposed wall portion of said first main wall defining an outwardly projecting hollow reinforcing rib merging with said substantially vertically disposed wall portion.

23. A boat lift motor and drive assembly comprising a substantially rigid mounting plate, a boat lift motor, means for fastening said boat lift motor to said mounting pate, said boat lift motor including a drive shaft carrying a drive pulley, a first gear connected to a driven shaft and a driven pulley, a pulley belt entrained about said drive pulley and said driven pulley, a second gear connected to an output shaft adapted for rotating a reel having a boat lift cable wound thereon, said second gear and output shaft having an axis disposed substantially normal to an axis of said driven shaft, a housing, said housing including first and second housing bodies cooperatively defining a chamber; said chamber housing said mounting plate, said boat lift motor, said drive and driven pulleys, said pulley belt and said first and second gears; means for removably securing said first and second housing bodies to each other; said first housing body having opposite side edge portions, opposite upper and lower edge portions and substantially medially located vertical and horizontal planes disposed substantially normal to each other; said edge portions being peripherally disposed about a main wall of said first housing body; said main wall including first and second wall portions located at opposite sides of said horizontal plane and being adapted for selective removal, said first wall portion including an opening defined by a continuous cut edge through which projects said output shaft to thereby define one of two selected positions of 180° oriented installation; a substantially vertically disposed wall portion of said main wall defining an inwardly opening generally concave chamber at least partially receiving therein said driven pulley; and said vertically disposed wall portion being laterally offset relative to said vertical plane and being substantially bisected by said horizontal plane to thereby accommodate said pulley therein.

24. The boat lift motor and drive assembly as defined in claim 23 wherein said removably securing means are symmetrically located for securing said first and second housing bodies to each other in each of said two positions of 180° oriented installation.

25. The boat lift motor and drive assembly as defined in claim 23 including a substantially rigid mounting plate within said chamber upon which is adapted to be mounted a motor, a pulley drive and a gear drive; and means for fastening said boat lift motor to the unremoved of the first and second wall portions in the second position of 180° oriented installation.

26. The boat lift motor and drive assembly as defined in claim 23 including a substantially horizontally disposed wall portion of said main wall defining an outwardly projecting reinforcing rib disposed substantially between said first and second wall portions.

27. The boat lift motor and drive assembly as defined in claim 23 including a substantially horizontally disposed wall portion of said main wall defining an outwardly projecting hollow rib disposed substantially between said first and second wall portions.

28. The boat lift motor and drive assembly as defined in claim 23 including a substantially horizontally disposed wall portion of said main wall defining an outwardly projecting reinforcing rib merging with said substantially vertically disposed wall portion.

29. The boat lift motor and drive assembly as defined in claim 23 including a substantially horizontally disposed wall portion of said first main wall defining an outwardly projecting hollow reinforcing rib merging with said substantially vertically disposed wall portion.

30. The boat lift motor and drive assembly as defined in claim 23 wherein each of said first and second housing bodies are of an integral one-piece construction.

31. The boat lift motor and drive assembly as defined in claim 23 wherein said main wall is of a molded integral one-piece construction initially devoid of openings in said first and second wall portions, and a substantially continuous cut peripheral edge defining an opening in one of said first and second wall portions.

32. The boat lift motor and drive assembly as defined in claim 23 wherein said first and second housing bodies include respective first and second peripheral edges in mating relationship to each other, and said removably securing means are a plurality of fasteners symmetrically disposed about and securing together said first and second peripheral edges in each of said two positions of 180° oriented installation.

33. The boat lift motor and drive assembly as defined in claim 24 including a substantially rigid mounting plate within said chamber upon which is adapted to be mounted a motor, a pulley drive and a gear drive; and means for fastening said boat lift motor to the unremoved of the first and second wall portions in the second position of 180° oriented installation.

34. The boat lift motor and drive assembly as defined in claim 24 including a substantially horizontally disposed wall portion of said main wall defining an outwardly projecting reinforcing rib disposed substantially between said first and second wall portions.

35. The boat lift motor and drive assembly as defined in claim 24 including a substantially horizontally disposed wall portion of said main wall defining an outwardly projecting hollow rib disposed substantially between said first and second wall portions.

36. The boat lift motor and drive assembly as defined in claim 24 including a substantially horizontally disposed wall portion of said main wall defining an outwardly projecting reinforcing rib merging with said substantially vertically disposed wall portion.

37. The boat lift motor and drive assembly as defined in claim 24 including a substantially horizontally disposed wall portion of said first main wall defining an outwardly projecting hollow reinforcing rib merging with said substantially vertically disposed wall portion.

38. The boat lift motor and drive assembly as defined in claim 24 wherein each of said first and second housing bodies are of an integral one-piece construction.

39. A housing for at least partially housing a boat lift pulley comprising a main wall, said main wall having a substantially vertically disposed wall portion defining an inwardly opening generally concave chamber adapted to at least partially receive therein a pulley of an associated pulley drive; said main wall including opposite side edge portions, opposite upper and lower edge portions and substantially medially located vertical and horizontal planes disposed substantially normal to each other; said edge portions being peripherally disposed about said main wall of said housing; said main wall including first and second wall portions located at opposite sides of said horizontal plane and being adapted for selective removal whereby a gear driven shaft can project therethrough thereby adapting said housing for selective utilization in either of two positions of installation oriented 180° relative to each other; and said vertically disposed wall portion being laterally offset relative to said vertical plane and being substantially bisected by said horizontal plane to thereby accommodate a pulley therein in each of two positions of 180° oriented installation.

40. The housing as defined in claim 39 wherein removable securing means are symmetrically located for securing said housing to a companion housing in each of said two positions of 180° oriented installation.

41. The housing as defined in claim 39 including a substantially rigid mounting plate within said chamber upon which is adapted to be mounted a motor, a pulley drive and a gear drive; and means for fastening said boat lift motor to the unremoved of the first and second wall portions in the second position of 180° oriented installation.

42. The housing as defined in claim 39 including a substantially horizontally disposed wall portion of said main wall defining an outwardly projecting reinforcing rib disposed substantially between said first and second wall portions.

43. The housing as defined in claim 39 including a substantially horizontally disposed wall portion of said main wall defining an outwardly projecting hollow rib disposed substantially between said first and second wall portions.

44. The housing as defined in claim 39 including a substantially horizontally disposed wall portion of said main wall defining an outwardly projecting reinforcing rib merging with said substantially vertically disposed wall portion.

45. The housing as defined in claim 39 including a substantially horizontally disposed wall portion of said first main wall defining an outwardly projecting hollow reinforcing rib merging with said substantially vertically disposed wall portion.

46. The housing as defined in claim 39 wherein each of said housing is of an integral one-piece construction.

47. The housing as defined in claim 39 wherein said main wall is of a molded integral one-piece construction initially devoid of openings in said first and second wall portions, and a substantially continuous cut peripheral edge defining an opening in one of said first and second wall portions.

48. The housing as defined in claim 39 wherein removable securing means are a plurality of fasteners symmetrically disposed about and securing together said housing and a companion housing in each of said two positions of 180° oriented installation.

49. The housing as defined in claim 41 including a substantially horizontally disposed wall portion of said main wall defining an outwardly projecting reinforcing rib disposed substantially between said first and second wall portions.

50. The housing as defined in claim 41 including a substantially horizontally disposed wall portion of said main wall defining an outwardly projecting hollow rib disposed substantially between said first and second wall portions.

51. The housing as defined in claim 41 including a substantially horizontally disposed wall portion of said main wall defining an outwardly projecting reinforcing rib merging with said substantially vertically disposed wall portion.

52. The housing as defined in claim 41 including a substantially horizontally disposed wall portion of said first main wall defining an outwardly projecting hollow reinforcing rib merging with said substantially vertically disposed wall portion.

53. A housing for at least partially housing a boat lift pulley comprising a main wall, said main wall having a substantially vertically disposed wall portion defining an inwardly opening generally concave chamber adapted to at least partially receive therein a pulley of an associated pulley drive; said main wall including opposite side edge portions, opposite upper and lower edge portions and substantially medially located vertical and horizontal planes disposed substantially normal to each other; said edge portions being peripherally disposed about said main wall of said housing; said main wall including first and second wall portions located at opposite sides of said horizontal plane and being adapted for selective removal whereby a gear driven shaft can project therethrough thereby adapting said housing for selective utilization in either of two positions of installation oriented 180° relative to each other; and said vertically disposed wall portion being laterally offset relative to said vertical plane.

54. The housing as defined in claim 53 including a substantially rigid mounting plate Within said chamber upon which is adapted to be mounted a motor, a pulley drive and a gear drive; and means for fastening said boat lift motor to the unremoved of the first and second wall portions in the second position of 180° oriented installation.

55. The housing as defined in claim 53 including a substantially horizontally disposed wall portion of said main wall defining an outwardly projecting reinforcing rib disposed substantially between said first and second wall portions.

56. The housing as defined in claim 53 including a substantially horizontally disposed wall portion of said main wall defining an outwardly projecting hollow rib disposed substantially between said first and second wall portions.

57. The housing as defined in claim 53 including a substantially horizontally disposed wall portion of said main wall defining an outwardly projecting reinforcing rib merging with said substantially vertically disposed wall portion.

58. The housing as defined in claim 53 including a substantially horizontally disposed wall portion of said first main wall defining an outwardly projecting hollow reinforcing rib merging with said substantially vertically disposed wall portion.

59. The housing as defined in claim 53 wherein each of said housing is of an integral one-piece construction.

60. The housing as defined in claim 53 wherein said main wall is of a molded integral one-piece construction initially devoid of openings in said first and second wall portions, and a substantially continuous cut peripheral edge defining an opening in one of said first and second wall portions.

61. The housing as defined in claim 53 including means for removably securing said housing to a companion housing in each of two positions of 180° oriented installation.

62. The housing as defined in claim 61 wherein said removable securing means are symmetrically located relative to said housing and an associated companion housing.

63. The housing as defined in claim 62 including a substantially rigid mounting plate within said chamber upon which is adapted to be mounted a motor, a pulley drive and a gear drive; and means for fastening said boat lift motor to the unremoved of the first and second wall portions in the second position of 180° oriented installation.

64. The housing as defined in claim 62 including a substantially horizontally disposed wall portion of said main wall defining an outwardly projecting reinforcing rib disposed substantially between said first and second wall portions.

65. The housing as defined in claim 62 including a substantially horizontally disposed wall portion of said main wall defining an outwardly projecting hollow rib disposed substantially between said first and second wall portions.

66. The housing as defined in claim 62 including a substantially horizontally disposed wall portion of said main wall defining an outwardly projecting reinforcing rib merging with said substantially vertically disposed wall portion.

67. The housing as defined in claim 62 including a substantially horizontally disposed wall portion of said first main wall defining an outwardly projecting hollow reinforcing rib merging with said substantially vertically disposed wall portion.

68. The housing as defined in claim 62 wherein each of said housing is of an integral one-piece construction.

69. The housing as defined in claim 62 wherein said main wall is of a molded integral one-piece construction initially devoid of openings in said first and second wall portions, and a substantially continuous cut peripheral edge defining an opening in one of said first and second wall portions.

70. A method of at least partially housing a pulley of a boat lift motor comprising the steps of:

(a) providing an integral one-piece housing having a main wall bounded by opposite side edge portions, opposite upper and lower edge portions and substantially medially located vertical and horizontal planes disposed substantially normal to each other and first and second wall portions located at opposite sides of the horizontal plane and laterally adjacent a vertically disposed wall portion of the main wall defining an inwardly opening generally concave chamber adapted to at least partially receive therein a pulley of a boat lift motor, and (b) removing material from one of the wall portions dependent upon one of two positions of installation of the housing oriented 180° relative to each other at each of which an opening formed by the removed material is located above the horizontal plane but the concave chamber is located at opposite sides of the vertical plane in the respective two positions.

71. The method as defined in claim 70 including the steps of:

(c) providing another housing-identical to the housing provided in step (a), and (d) removing material from the other of the wall portions of the another housing to thereby effect the 180° orientation relative to a single boat lift installation.

72. The method as defined in claim 70 including the step of removing material from the other of the wall portions to form apertures through which are adapted to pass boat lift motor fasteners.

* * * * *